(12) United States Patent
Gupta et al.

(10) Patent No.: US 10,690,489 B2
(45) Date of Patent: *Jun. 23, 2020

(54) SYSTEMS, METHODS, AND MEDIA FOR PERFORMING SHAPE MEASUREMENT

(71) Applicant: The Trustees of Columbia University in the City of New York, New York, NY (US)

(72) Inventors: Mohit Gupta, New York, NY (US); Shree K. Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/853,246

(22) Filed: Dec. 22, 2017

(65) Prior Publication Data

US 2018/0347971 A1 Dec. 6, 2018

Related U.S. Application Data

(63) Continuation of application No. 14/621,068, filed on Feb. 12, 2015, now Pat. No. 9,857,168, which is a (Continued)

(51) Int. Cl.
*G01B 11/25* (2006.01)
*G06K 9/46* (2006.01)

(52) U.S. Cl.
CPC ........ *G01B 11/2536* (2013.01); *G01B 11/254* (2013.01); *G06K 9/4661* (2013.01)

(58) Field of Classification Search
CPC ........... G01B 11/2513; G01B 11/2536; G01B 11/254; G06K 9/4661
See application file for complete search history.

(56) References Cited

U.S. PATENT DOCUMENTS 6,229,913 B1 * 5/2001 Nayar ............... G02B 27/2278
382/154
6,281,193 B1 8/2001 Bernal et al.
(Continued)

FOREIGN PATENT DOCUMENTS

WO WO2011080471 A1 7/2011

OTHER PUBLICATIONS

Office Action dated Dec. 20, 2018 in JP Patent Application No. 2018-017795.
(Continued)

*Primary Examiner* — Zhubing Ren
(74) *Attorney, Agent, or Firm* — Byrne Poh LLP

(57) ABSTRACT

Systems, methods, and media for performing shape measurement are provided. In some embodiments, systems for performing shape measurement are provided, the systems comprising: a projector that projects onto a scene a plurality of illumination patterns, wherein each of the illumination patterns has a given frequency, each of the illumination patterns is projected onto the scene during a separate period of time, three different illumination patterns are projected with a first given frequency, and only one or two different illumination patterns are projected with a second given frequency; a camera that detects an image of the scene during each of the plurality of periods of time; and a hardware processor that is configured to: determine the given frequencies of the plurality of illumination patterns; and measure a shape of an object in the scene.

24 Claims, 4 Drawing Sheets

Related U.S. Application Data continuation of application No. 14/411,285, filed as application No. PCT/US2012/066307 on Nov. 21, 2012, now abandoned.

(60) Provisional application No. 61/563,470, filed on Nov. 23, 2011.

(56) References Cited

U.S. PATENT DOCUMENTS

| | | | |
|---|---|---|---|
| 7,986,321 | B2 | 7/2011 | Zhuang et al. |
| 2002/0039187 | A1 | 4/2002 | Keranen |
| 2004/0005092 | A1 | 1/2004 | Tomasi |
| 2005/0117172 | A1 | 6/2005 | Plamann et al. |
| 2005/0162381 | A1 | 7/2005 | Bell et al. |
| 2005/0280831 | A1 | 12/2005 | Fujiwara et al. |
| 2007/0115484 | A1* | 5/2007 | Huang ............... G01B 11/2527 356/604 |
| 2008/0279446 | A1 | 11/2008 | Hassebrook et al. |
| 2009/0046303 | A1 | 2/2009 | Dimitrov-Kuhl et al. |
| 2011/0080471 | A1 | 4/2011 | Song et al. |
| 2011/0262007 | A1 | 10/2011 | Kojima et al. |

OTHER PUBLICATIONS

Chen, T. et al., "Modulated Phase Shifting for 3D Scanning", In the Proceedings of the IEEE Computer Society Conference on Computer Vision and Pattern Recognition, Anchorage, AK, US, Jun. 2008, pp. 1-8.
Chen, T. et al., "Polarization and phase-shifting for 3D scanning of translucent objects", In the Proceedings of the IEEE Computer Society Conference on Computer Vision and Pattern Recognition, Minneapolis, MN, US, Jun. 2007, pp. 1-8.
Couture, V. et al. "Unstructured Light Scanning to Overcome Interreflections", In the Proceedings of the International Conference on Computer Vision, Barcelona, ES, Nov. 2011, pp. 1-9.
Gu, J. et al. "Multiplexed Illumination for Scene Recovery in the Presence of Global Illumination", In the Proceedings of the International Conference on Computer Vision, Barcelona, ES, Nov. 2011, pp. 1-8.
Gupta, M et al., "(De)Focusing on Global Light Transport for Active Scene Recovery", In Proceedings of the IEEE CVPR, Miami, FL, US, Jun. 20-25, 2009, pp. 1-8.
Gupta, M. et al. "Structured Light 3D Scanning in the Presence of Global Illumination", In the Proceedings of the IEEE Computer Society Conference on Computer Vision and Pattern Recognition, Colorado Springs, CO, US, Jun. 2011, pp. 1-8.
Gupta, Mohit et al. "A Combined Theory of Defocused Illumination and Global Light Transport", In International Journal of Computer Vision, Oct. 2011, pp. 1-22.
Gupta, Mohit et al. "Micro Phase Shifting", In the Proceedings of the IEEE Computer Society Conference on Computer Vision and Patern Recognition, Providence, RI, US, Jun. 2012, pp. 1-8.
Gupta, Mohit, "(De) Focused Illumination and Global Light Transport", Technical Report, Carnegie Mellon Graphics Lab, 2011 (month unknown), pp. 1-3, available at: http://graphics.cs.cmu.edu/projects/DefocusGlobal/.
Gupta, Mohit. "Measuring Shape in the Presence of Inter-reflections, Sub-surface Scattering and Defocus", Technical Report, Carnegie Mellon Graphics Lab, 2011 (month unknown), pp. 1-3, available at: http://graphics.cs.cmu.edu/projects/StructuredLight3DScanning/.
Gushov, V.I. and Solodkin, Y.N., "Automatic processing of fringe patterns in integer interferometers", In Optics Lasers Engineering, 1991 (month unknown), pp. 311-324.

Hermans, C. et al., "Depth from sliding projections", In the Proceedings of the IEEE Computer Society Conference on Computer Vision and Pattern Recognition, Miami Beach FL, US, Jun. 2009, pp. 1-8.
Holroyd, M. et al., "A coaxial optical scanner for synchronous acquisition of 3D geometry and surface reflectance", In ACM Transactions on Graphics, Jun. 2010, pp. 1-11.
International Patent Application No. PCT/US2012/066307, filed Nov. 21, 2012.
International Preliminary Report on Patentability dated May 27, 2014 in International Patent Application No. PCT/US2012/066307.
International Search Report dated Apr. 26, 2013 in International Application No. PCT/US2012/066307.
Nayar, S. et al., "Shape from inter-reflections", In the International Journal of Computer Visions, Aug. 1991, pp. 173-195.
Nayar, S.K. et al., "Fast Separation of Direct and Global Components of a Scene Using High Frequency Illumination", In Proceedings of the ACM Transaction on Graphics, vol. 25, No. 3, Jul. 2006, pp. 1-10.
Notice of Allowance dated Aug. 21, 2017 in U.S. Appl. No. 14/621,068.
Office Action dated Jan. 31, 2017 in U.S. Appl. No. 14/411,285.
Office Action dated Jan. 31, 2017 in U.S. Appl. No. 14/621,068.
Office Action dated Feb. 16, 2016 in CN Patent Application No. 201280051285.0.
Office Action dated May 20, 2015 in U.S. Appl. No. 14/621,068.
Office Action dated Aug. 15, 2017 in CN Patent Application No. 201280051285.0.
Office Action dated Aug. 21, 2017 in JP Patent Application No. 2014-543568.
Office Action dated Oct. 11, 2016 in JP Patent Application No. 2014-543568.
Office Action dated Nov. 22, 2016 in US Application No. 201280051285.0.
Office Action dated Dec. 23, 2015 in U.S. Appl. No. 14/621,068.
Park, J. and Kak, A.C., "3D modeling of optically challenigng objects", in IEEE Transactions on Visualization and Computer Graphics, Jan. 2008, pp. 1-18.
Salvi, J. et al., "A State of the Art in Structured Light Patterns for Surface Profilometry", In Pattern Recognition, vol. 43, No. 8, Mar. 2010, pp. 1-36.
Supplementary European Search Report dated Jun. 3, 2015 in European Patent Application No. 12851581.4.
Takeda, M. et al., "Frequency-multiplex fourier-transform profilometry: a single-shot three-dimensional shape measurement of objects with large height discontinuities and/or surface isolations", In Applied Optics, Aug. 1997, pp. 5347-5354.
Towers, C.E. et al., "Absolute fringe order calculation using optimised multi-frequency selection in full-field profilometry", In Optics and Lasers in Engineering, 2005 (month unknown), pp. 788-800.
Tsai et al., "Fractional Fringe Order Method Using Fourier Analysis for Absolute Measurement of Block Gauge Thickness", Optical Review, vol. 6, No. 5, Apr. 23, 1999, pp. 449-454.
U.S. Appl. No. 61/563,470, filed Nov. 23, 2011.
Wolfram Mathworld, "Euclidean Algorith", last accessed Nov. 11, 2015, pp. 1-3, available at: http://mathworld.wolfram.com/euclideanalgorithm.html.
Written Opinion dated Apr. 26, 2013 in International Patent Application No. PCT/US2012/066307.
Xu, Y. and Aliaga, D., "An adaptive correspondence algorithm for modeling scenes with strong interreflections", In IEEE Transactions on Visualizaiton and Computer Graphics, Jun. 2008, pp. 1-16.
Zhao, H. et al., "Phase-unwrapping algorthim for hte measurement of three-dimensional object shapes", In Applied Optics, Jul. 1994, pp. 4497-4500.

* cited by examiner

SYSTEMS, METHODS, AND MEDIA FOR PERFORMING SHAPE MEASUREMENT

CROSS REFERENCE TO RELATED APPLICATION

This application is a continuation of U.S. patent application Ser. No. 14/621,068, filed Feb. 12, 2015, which is a continuation of U.S. patent application Ser. No. 14/411,285, filed Dec. 24, 2014, which is the United States National Phase Application under 35 U.S.C. § 371 of International Application No. PCT/US2012/066307, filed Nov. 21, 2012, which claims the benefit of U.S. Provisional Patent Application No. 61/563,470, filed Nov. 23, 2011, each of which are hereby incorporated by reference herein in their entireties.

STATEMENT REGARDING GOVERNMENT FUNDED RESEARCH

This invention was made with government support under contract IIS-0964429 awarded by the National Science Foundation and under contract N00014-11-1-0285 awarded by the Office of Naval Research. The government has certain rights in the invention.

BACKGROUND

Phase shifting is a reliable and widely used shape measurement technique. Because of its low cost, high speed, and precision, it has found applications in surgery, factory automation, performance capture, digitization of cultural heritage, and other applications.

Phase shifting belongs to a class of active stereo triangulation techniques. In these techniques, correspondence between camera and projector pixels is established by projecting coded intensity patterns on the scene. This correspondence can then be used to triangulate points in the scene to establish a shape of an object in the scene.

Like other active scene recovery techniques, phase shifting assumes that scene points are only directly illuminated by a single light source and thus that there is no global illumination. In practice, however, global illumination is ubiquitous due to inter-reflections and subsurface scattering. In fact, global illumination arises in virtually every real world scene. As a result, typical phase shifting produces erroneous results due to such global illumination.

Furthermore, phase shifting algorithms also typically assume that the light source is a perfect point with infinite depth of field. However, all sources of light have limited depths of field, which results in defocus. In order to account for defocus, existing phase shifting techniques need to capture a large number of input images.

Accordingly, new mechanisms for performing shape measurement are desirable.

SUMMARY

Systems, methods, and media for performing shape measurement are provided. In some embodiments, systems for performing shape measurement are provided, the systems comprising: a projector that projects onto a scene a plurality of illumination patterns, wherein each of the illumination patterns has a given frequency, each of the illumination patterns is projected onto the scene during a separate period of time, three different illumination patterns are projected with a first given frequency, and only one or two different illumination patterns are projected with a second given frequency; a camera that detects an image of the scene during each of the plurality of periods of time; and a hardware processor that is configured to: determine the given frequencies of the plurality of illumination patterns; and measure a shape of an object in the scene.

In some embodiments, methods for performing shape measurement are provided, the methods comprising: projecting onto a scene a plurality of illumination patterns using a projector, wherein each of the illumination patterns has a given frequency, each of the illumination patterns is projected onto the scene during a separate period of time, three different illumination patterns are projected with a first given frequency, and only one or two different illumination patterns are projected with a second given frequency; detecting an image of the scene during each of the plurality of periods of time using a camera; determining the given frequencies of the plurality of illumination patterns using a hardware processor; and measuring a shape of an object in the scene using the hardware processor.

In some embodiments, non-transitory computer-readable media containing computer-executable instructions that, when executed by a processor, cause the processor to perform a method for performing shape measurement are provided, the method comprising: projecting onto a scene a plurality of illumination patterns, wherein each of the illumination patterns has a given frequency, each of the illumination patterns is projected onto the scene during a separate period of time, three different illumination patterns are projected with a first given frequency, and only one or two different illumination patterns are projected with a second given frequency; detecting an image of the scene during each of the plurality of periods of time; determining the given frequencies of the plurality of illumination patterns; and measuring a shape of an object in the scene.

DETAILED DESCRIPTION

Systems, methods, and media for performing shape measurement are provided. In some embodiments, mechanisms for shape measurement can project illumination patterns on a scene containing one or more objects using any suitable projector, and reflections of those illumination patterns from the scene can be detected and stored as images by any suitable camera. The patterns that are projected can be any suitable patterns such as sinusoidal patterns. The frequencies that are used for these patterns can be chosen to be high enough so that both global illumination and defocus effects remain essentially constant for all of the detected and stored images. A correspondence between projector pixels and camera pixels can then be determined and used to triangulate points on the surface on the objects in the scene and hence determine the shapes of those objects.

Figure 1:
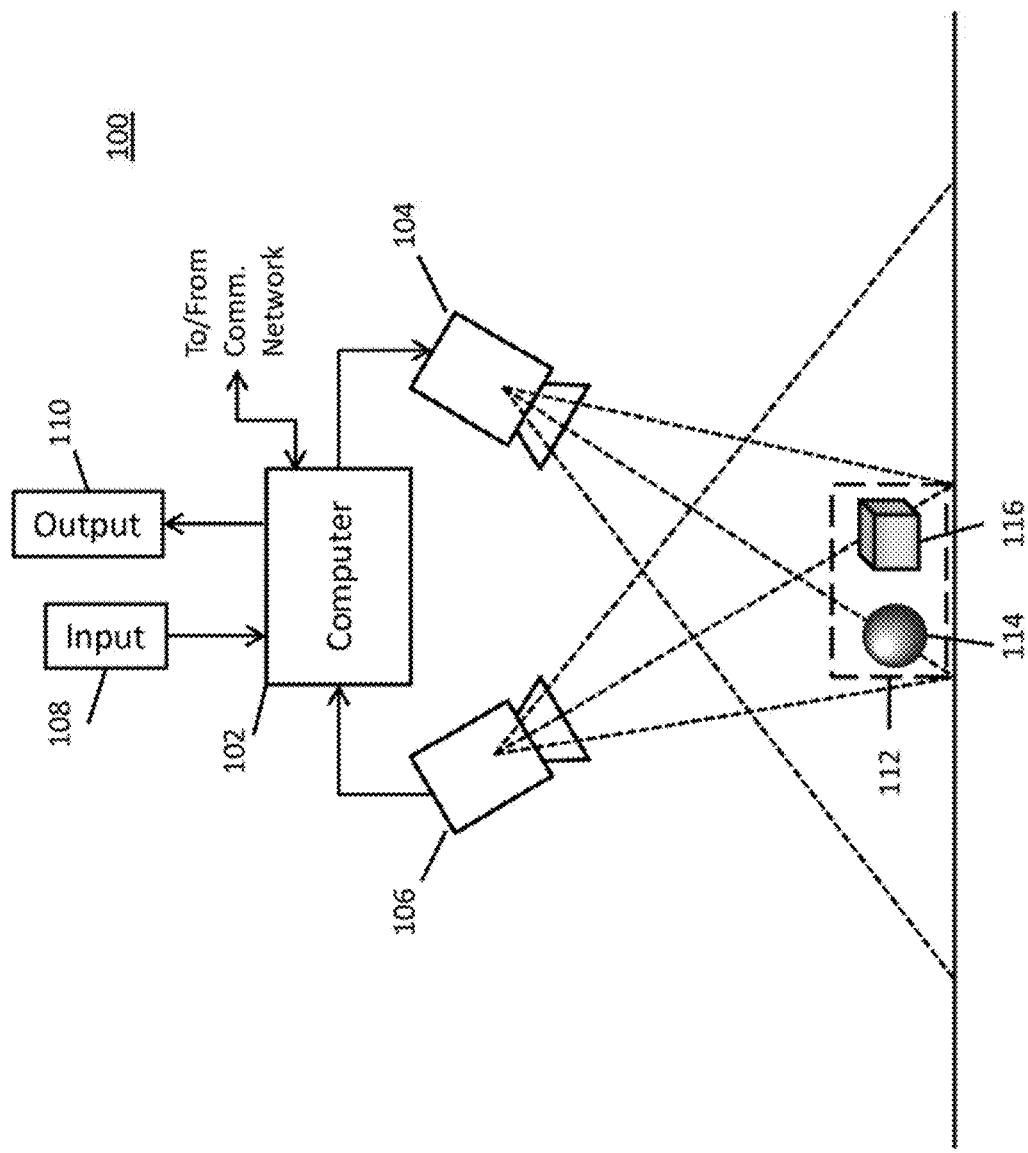
FIG. 1 is a block diagram of an example of hardware for performing shape measurement that can be used in accordance with some embodiments.

Turning to FIG. 1, an example 100 of hardware that can be used in accordance with some embodiments is illustrated. As shown, hardware 100 can include a computer, a projector, a camera, one or more input devices 108, and one or more output devices 110 in some embodiments.

During operation, computer 102 can cause projector 104 to project any suitable number of structure light images onto a scene 112, which can include any suitable objects, such as objects 114 and 116, in some embodiments. At the same time, camera 106 can detect light reflecting from the scene and provide detected images to the computer in some embodiments. The computer can then perform processing as described herein to determine the shape and any other suitable data regarding the objects in the scene in some embodiments.

Figure 2:
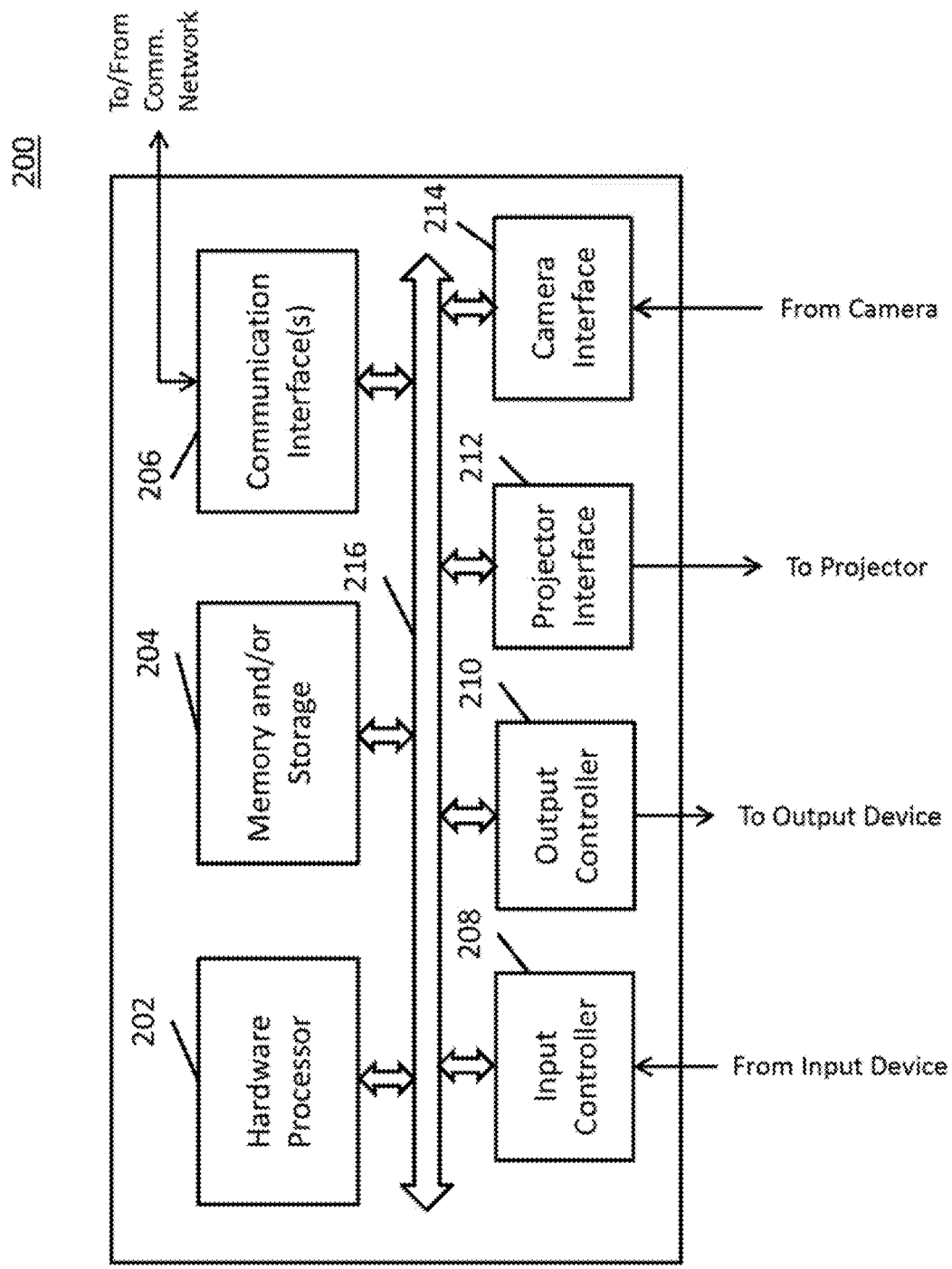
FIG. 2 is a block diagram of an example of computer hardware that can be used in accordance with some embodiments.

Computer 102 can be any suitable processing device for controlling the operation of projector 104 and camera 106, for performing calculations as described herein, for generating any suitable output, and/or for performing any other suitable functions in some embodiments. Features of computer 102 in accordance with some embodiments are described further in connection with FIG. 2.

Projector 104 can be any suitable device for projecting structure light images as described herein. For example, projector 104 can be a projection system, a display, etc. More particularly, for example, in some embodiments, projector 104 can be a SANYO PLC-XP18N projection system available from SANYO NORTH AMERICA CORPORATION of San Diego, Calif.

Camera 106 can be any suitable device for detecting images as described herein. For example, camera 106 can be a photograph camera, a video camera, a light sensor, an image sensor, etc. More particularly, for example, in some embodiments, camera 106 can be a machine-vision camera available from POINT GREY RESEARCH, INC. of Richmond, British Columbia, Canada, or from LUMENERA CORPORATION of Ottawa, Ontario, Canada.

Input devices 108 can be any suitable one or more input devices for controlling computer 102 in some embodiments. For example, input devices 108 can include a touch screen, a computer mouse, a pointing device, one or more buttons, a keypad, a keyboard, a voice recognition circuit, a microphone, etc.

Output devices 110 can be any suitable one or more output devices for providing output from computer 102 in some embodiments. For example, output devices 110 can include a display, an audio device, etc.

Any other suitable components can be included in hardware 100 in accordance with some embodiments. Any suitable components illustrated in hardware 100 can be combined and/or omitted in some embodiments.

Computer 102 can be implemented using any suitable hardware in some embodiments. For example, in some embodiments, computer 102 can be implemented using any suitable general purpose computer or special purpose computer. Any such general purpose computer or special purpose computer can include any suitable hardware. For example, as illustrated in example hardware 200 of FIG. 2, such hardware can include a hardware processor 202, memory and/or storage 204, communication interface(s) 206, an input controller 208, an output controller 210, a projector interface 212, a camera interface 214, and a bus 216.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some embodiments.

Memory and/or storage 204 can be any suitable memory and/or storage for storing programs, data, images to be projected, detected images, measurements, etc. in some embodiments. For example, memory and/or storage 204 can include random access memory, read only memory, flash memory, hard disk storage, optical media, etc.

Communication interface(s) 206 can be any suitable circuitry for interfacing with one or more communication networks in some embodiments. For example, interface(s) 206 can include network interface card circuitry, wireless communication circuitry, etc.

Input controller 208 can be any suitable circuitry for receiving input from one or more input devices 108 in some embodiments. For example, input controller 208 can be circuitry for receiving input from a touch screen, from a computer mouse, from a pointing device, from one or more buttons, from a keypad, from a keyboard, from a voice recognition circuit, from a microphone, etc.

Output controller 210 can be any suitable circuitry for controlling and driving one or more output devices 110 in some embodiments. For example, output controller 210 can be circuitry for driving output to a display, an audio device, etc.

Projector interface 212 can be any suitable interface for interfacing hardware 200 to a projector, such as projector 104, in some embodiments. Interface 212 can use any suitable protocol in some embodiments.

Camera interface 214 can be any suitable interface for interfacing hardware 200 to a camera, such as camera 106, in some embodiments. Interface 212 can use any suitable protocol in some embodiments.

Bus 216 can be any suitable mechanism for communicating between two or more of components 202, 204, 206, 208, 210, 212, and 214 in some embodiments.

Any other suitable components can be included in hardware 200 in accordance with some embodiments. Any suitable components illustrated in hardware 200 can be combined and/or omitted in some embodiments.

Figure 3:
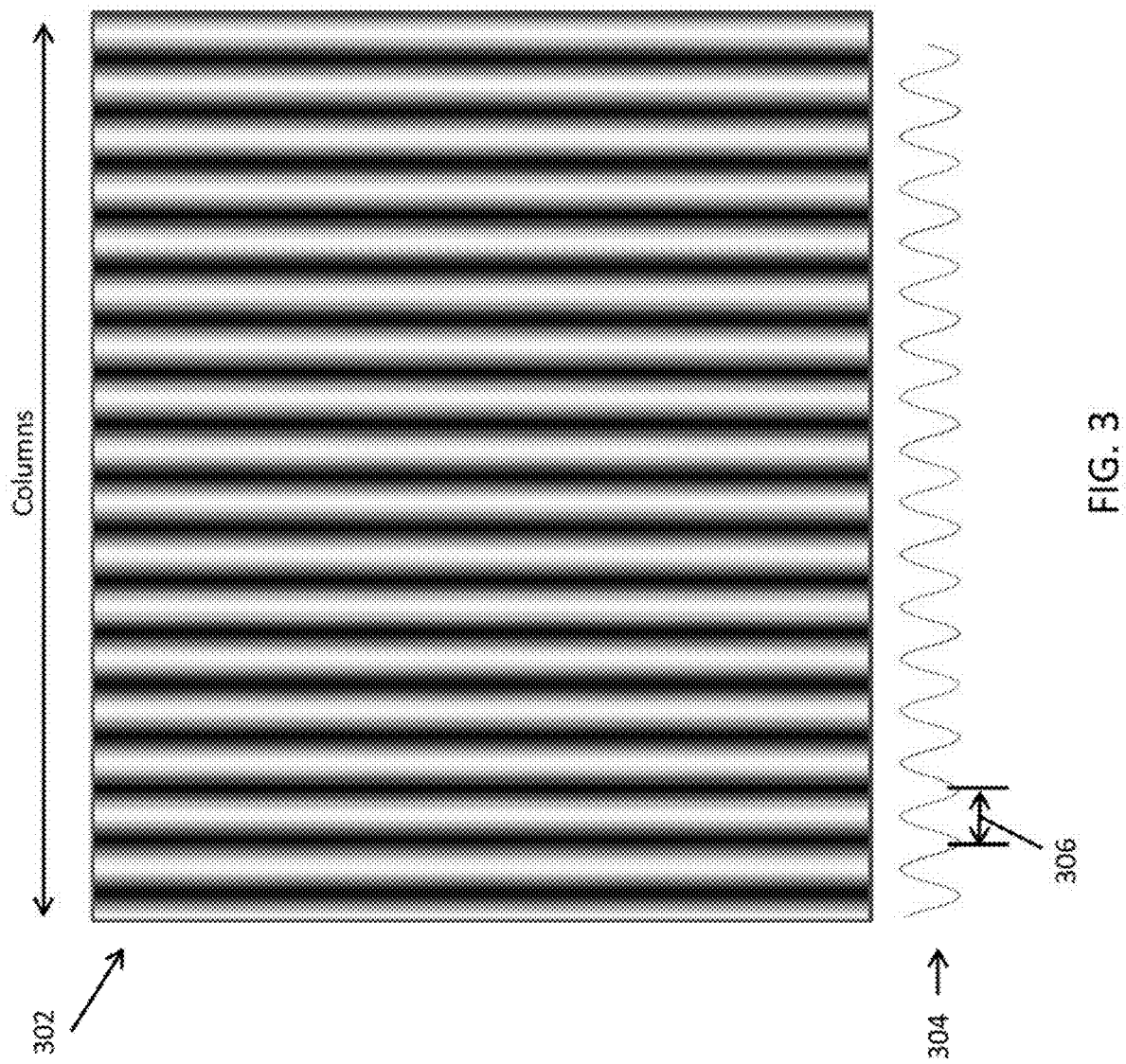
FIG. 3 is a diagram of an example of an illumination pattern that can be used in accordance with some embodiments.

FIG. 3 illustrates an example of a structured light pattern 302 that can be projected by projector 104 onto scene 112 in accordance with some embodiments. Pattern 302 can have an intensity that varies between white and black in accordance with a sine function, as shown by sine wave 304, in some embodiments. Thus, each of the columns of pixels in pattern 302 can have a given intensity vector. The period of the pattern, shown by 306, can be measured in pixels in some embodiments.

Figure 4:
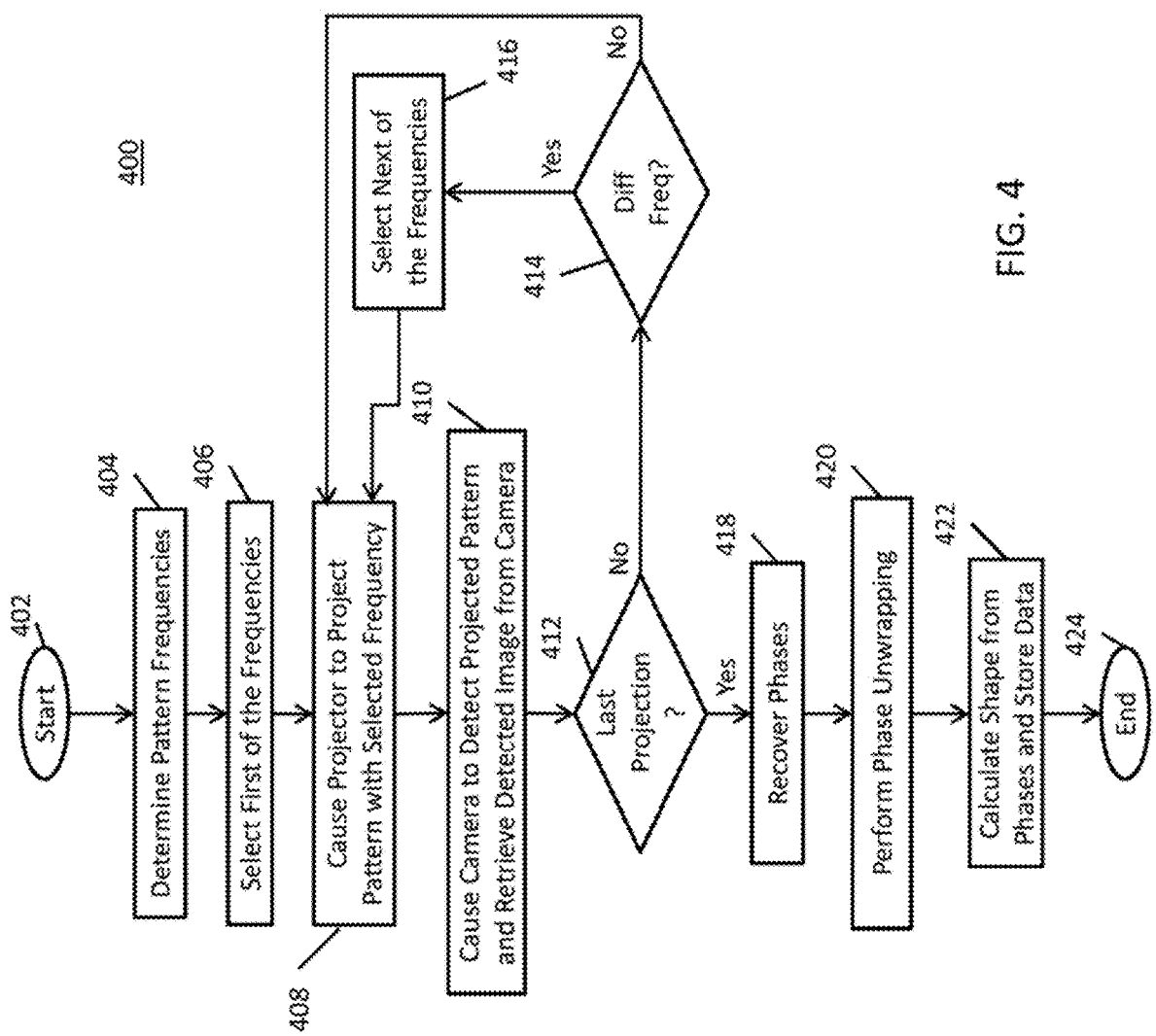
FIG. 4 is a diagram of an example of a process that can be used to perform shape measurement in accordance with some embodiments.

Turning to FIG. 4, an example 400 of a process for performing shape measurement in accordance with some embodiments is illustrated. This process can be performed in computer 102 of FIG. 1 in some embodiments.

As shown, after process 400 has begun at 402, the process can determine at 404 frequencies of structured light patterns to be projected in some embodiments. Any suitable frequencies can be used, and these frequencies can be determined in any suitable manner.

For example, in some embodiments, a set $\Omega$ of pattern frequencies (i.e., $\Omega=\{\omega_1, \ldots, \omega_F\}$) can be selected so as to meet the following two conditions: (1) the mean frequency $\omega_m$ is sufficiently high (period $\lambda$ is small) so that global illumination does not introduce significant errors in the recovered phase; and (2) the width of the frequency band $\delta$ (i.e., $\delta$ where all frequencies in $\Omega$ lie within the band $[\omega_m-\delta/2, \omega_m+\delta/2])$ is sufficiently small so that the camera detected amplitudes for all the frequencies are approximately the same, i.e., $$A_1 \approx A_2 \approx \ldots \approx A_F \approx A.$$

Regarding the first of these conditions, any suitable value for $\omega_m$ can be used in some embodiments. For example, in some embodiments, a mean frequency $\omega_m$ corresponding to a period $\lambda_m$ smaller than 96 pixels (e.g., 16, 32, etc. pixels) (as described above in connection with FIG. 3) can be sufficiently high to prevent errors in the recovered phase due to global illumination for a large collection of scenes. As another example, in some embodiments, a mean frequency $\omega_m$ higher than 10 Hz (e.g., 30 Hz, 60 Hz, etc.) can be sufficiently high to prevent errors in the recovered phase due to global illumination for a large collection of scenes.

In some embodiments, the selection of a mean frequency may take into account that, due to optical aberrations in a given projector used in such embodiments, the projector may not be able to project certain high frequencies reliably and therefore that a mean frequency lower than such high frequencies should be selected.

Regarding the second of these conditions, any suitable value for $\delta$ can be used in some embodiments. For example, in some embodiments, the width of the frequency band $\delta$ can be selected to be the largest value that will not cause the maximum variation in the amplitudes of reflected light between any pair of frequencies of projected patterns in the frequency band to exceed some percentage such as 1%, 5%, 10%, etc. based on the noise level of the camera. For example, higher noise levels in the camera will allow higher variations in the amplitudes of reflected light between pairs of frequencies of projected patterns. Such a variation in the amplitudes can be confirmed by measuring and averaging the amplitudes of reflected light over a large number of scene points receiving different amounts of global illumination and defocus in some embodiments.

In some embodiments, for a mean frequency $\omega_m$ corresponding to a period $\lambda_m$ of 16 pixels, the width of the frequency band $\delta$ can correspond to a period of 3 pixels.

In some embodiments, the selection of the width of the frequency band $\delta$ may take into account that, due to finite spatial and intensity resolution in a given projector used in such embodiments, the projector may not be able to reliably distinguish two frequencies if the difference between them is less than a threshold $\varepsilon$. Thus, in such embodiments, the width of the frequency band $\delta$ can be selected so as to be large enough to ensure that F different frequencies can be distinguished—i.e., are at least $\varepsilon$ apart.

Once the mean frequency $\omega_m$ and the width of the frequency band $\delta$ have been selected, a resulting frequency band can be determined. For example, based on a mean frequency $\omega_m$ corresponding to a period $\lambda_m$ of 16 pixels and a width of the frequency band $\delta$ corresponding to a period of 3 pixels, a resulting frequency band corresponding to periods of 14.5 through 17.5 pixels can be determined.

Next, the individual frequencies of the illumination patterns can be selected. These frequencies can be selected in any suitable manner in some embodiments. For example, in some embodiments, these frequencies can be selected so that depth errors due to phase errors are minimized. In some embodiments, because:

(a) such depth errors can be proportional to the phase error $\Delta\phi=|p-q|$, where, for a given camera pixel, p is the correct projector column and q is the computed projector column; and (b) when F frequencies are used, each projector column can be encoded with a unique F+2 dimensional intensity vector (i.e., one for each image to be projected), in order to minimize the probability of a phase error, the set of frequencies can be chosen so that the set of frequencies maximize the distance $d_{pq}$ between vectors corresponding to distinct projector columns. For a given frequency set $\Omega$, the average weighted distance between intensity vectors can be calculated as:

$$E(\Omega) = \frac{1}{N^2} \sum_{p,q=1}^{N} |p-q| d_{pq}$$

where N is the total number of projector columns. For $d_{pq}$, the norm-2 Euclidean distance can be chosen in some embodiments. In some embodiments, the set of frequencies in the frequency-band $[\omega_{min}, \omega_{max}]$ which minimizes $E(\Omega)$ can then be selected using the following constrained F dimensional optimization problem:

$$\Omega* = \arg\min_{\Omega} E(\Omega), \omega_f \in [\omega_m - \delta, \omega_m + \delta] \; \forall f$$

This optimization problem can be solved in any suitable manner. For example, in some embodiments, the simplex search method (e.g., as implemented in the MATLAB optimization toolbox) can be used to solve the optimization problem.

For the frequency band of [14.5, 17.5] pixels and F=5, the above procedure can return a frequency set corresponding to periods of 14.57, 16.09, 16.24, 16.47, and 16.60 pixels in some embodiments.

Once process 400 has selected the illumination pattern frequencies, process 400 can next select a first of these frequencies at 406 in some embodiments. Any suitable frequency can be selected and that frequency can be selected in any suitable manner in some embodiments. For example, in some embodiments, the lowest frequency, the highest frequency, or the frequency closest to the mean frequency can be selected as the first of the frequencies.

Next, at 408, process 400 can cause the projector to project an illumination pattern with the selected frequency at 408 in some embodiments. For example, process 400 can cause projector 104 of FIG. 1 to project illumination pattern 302 of FIG. 3 with a frequency equal to the selected first frequency.

While the projector is projecting the illumination pattern initiated at 408, process 400 can cause the camera to detect the projected pattern as reflected off the scene as a detected image and retrieve this image from the camera at 410 in some embodiments.

Process can next determine whether the projection just made at 408 is the last projection at 412 and, if not, whether a different frequency is to be used for the next projection at 414. These determinations can be made on any suitable basis and in any suitable manner. For example, process 400 can determine that another projection is needed when all frequencies in the set of frequencies determined at 404 have not yet been selected at either 406 or 416. As another example, process 400 can determine that another projection is needed when two or more phase shifted projections are specified for a given frequency, but each of those projections has not yet been made at 408.

More particularly, for example, in some embodiments, for a given number of frequencies F, F+2 images can be projected and detected in some embodiments. Even more particularly, in some embodiments, three images can be projected and detected for a first frequency and one image can be projected and detected for each of the remaining F−1 frequencies.

Thus, at 412, process 400 can determine if the last projection was just made. If so, then process 400 can proceed to 418 to recover the phases of the projector pixels at each of the projected frequencies as described further below. Otherwise, process 400 can determine at 414 whether a different frequency is to be used for the next projection. If so, process 400 can select the next frequency at 416 and then loop back to 408. Otherwise, process 400 can loop back to 408.

As mention above, at 418, process 400 can recover the phases of the projector pixels at each of the projected frequencies in some embodiments. Recovering the phases can be performed in any suitable manner in some embodiments. For example, based on the detected images retrieved at 410, process 400 can recover the phase values using the following equation:

$$\phi_f(p) = \begin{cases} \operatorname{acos}\left(\dfrac{U_{fact}(f+1)}{A(c)}\right) & \text{if } f = 1, \\ \operatorname{acos}\left(\dfrac{U_{fact}(f+2)}{A(c)}\right) & \text{if } 2 \le f \le F. \end{cases}$$

where:

f is an identifier numbered 1 through F of a frequency in set $\Omega$;

p is the projector pixel which illuminates camera pixel c;

A(c) is the amplitude at frequency f of camera pixel c, encapsulates the scene bidirectional reflectance distribution function (BRDF), surface shading effects, and intensity fall-off from the projector, and can be represented as A(c)=$\sqrt{U_{fact}(2)^2 + U_{fact}(3)^2}$; and $$U_{fact} = \begin{bmatrix} O(c) \\ A(c) * \cos(\phi_1(p)) \\ A(c) * \sin(\phi_1(p)) \\ A(c) * \cos(\phi_2(p)) \\ \vdots \\ A(c) * \cos(\phi_F(p)) \end{bmatrix}.$$

$U_{fact}$ can be computed by solving the linear system given in the following equation:

$$U_{micro} = R_{micro}/M_{micro}$$

where:

$R_{micro}$ is the vector of recorded intensities;

$M_{micro}$ is a square matrix of size F+2, and is given as:

$$M_{micro} = \begin{bmatrix} 1 & 1 & 0 & 0 \ldots 0 \\ 1 & \cos\left(\dfrac{2\pi}{3}\right) & -\sin\left(\dfrac{2\pi}{3}\right) & 0 \ldots 0 \\ 1 & \cos\left(\dfrac{4\pi}{3}\right) & -\sin\left(\dfrac{4\pi}{3}\right) & 0 \ldots 0 \\ 1 & 0 & 0 & \\ \vdots & \vdots & \vdots & \mathbb{I}_{F-1} \\ 1 & 0 & 0 & \end{bmatrix},$$

and in which $\mathbb{I}_{F-1}$ is an identity matrix of size F−1−F−1:

$$\mathbb{I}_{F-1} = \begin{bmatrix} 1 & 0 & \ldots & 0 \\ 0 & 1 & \ldots & 0 \\ \vdots & \vdots & \ddots & \vdots \\ 0 & 0 & \ldots & 1 \end{bmatrix};$$

and

O(c) if the offset term of camera pixel c, and encapsulates the contribution of ambient illumination.

Once the phases have been recovered, phase unwrapping can be performed at 420 in some embodiments. Phase wrapping can be performed using any suitable technique in some embodiments. For example, in some embodiments, the Gushov-Solodkin (G-S) algorithm (described in V. I. Gushov and Y. N. Solodkin, "Automatic processing of fringe patterns in integer interferometers," Optics Lasers Engineering, 14, 1991, which is hereby incorporated by reference herein in its entirety) can be used to combine several high frequency phases into a single low frequency phase. If the periods of the high-frequency sinusoids are pairwise co-prime (no common factors), then a low frequency sinusoid with a period equal to the product of the periods of all the high-frequency sinusoids can be simulated.

To implement the Gushov-Solodkin (G-S) algorithm, any suitable approach can be used in some embodiments. For example, in some embodiments, the phases at each frequency can first be converted into residual projector column numbers $p_f$ as follows:

$$p_f = \dfrac{\phi_f}{2\pi}\lambda_f \; \forall f$$

For example, suppose $\lambda_f$=16 pixels (period of the frequency f) and $\phi_f$=π/4 (phase of the frequency f). Then, the residual column number can be given as $p_f$=2. Next, the final disambiguated column correspondence p can be given as:

$$p = p_1 b_1 M_1 + \ldots + p_F b_F M_F,$$

where $M_f = (\lambda_1 \lambda_2 \ldots \lambda_F)/\lambda_f$, and the coefficients $b_f$ are computed by solving the congruence $b_f M_f \equiv 1 \pmod{\lambda_f}$. Such congruences can be solved with the Euclid algorithm. In some embodiments, the above procedure can also be used for non-integral residuals $p_f$ and periods $\lambda_f$ by making the following modification: first round the residuals for computing the unwrapped column number p, and then add back the fractional part to p.

Once phase unwrapping has been completed, at 422, the shape(s) of objects in the scene can be calculated by determining correspondence between the phases of camera pixels columns c and the phases of projector pixels columns p and then by determining the three dimensional (3D) locations of points on the surface(s) ($S_x$, $S_y$, $S_z$) of objects in the scene by triangulation. This shape data can then be stored in suitable memory and/or storage.

In accordance with some embodiments, triangulation can be performed in any suitable manner. For example, in some embodiments, triangulation can be performed as follows.

The 3D coordinates of the camera center and the projector center, ($C_{Cam1}$, $C_{Cam2}$, $C_{Cam3}$) and ($C_{Proj1}$, $C_{Proj2}$, $C_{Proj3}$), respectively, can be computed a priori by geometrically calibrating the projector and the camera as known in the art. Let the 3D coordinates of the camera pixel c be ($V_{c1}$, $V_{c2}$, $V_{c3}$). The 3D coordinates of the camera pixel c ($V_{c1}$, $V_{c2}$, $V_{c3}$) are known because the camera pixel coordinates are known.

The projector column p and the projector center ($C_{Proj1}$, $C_{Proj2}$, $C_{Proj3}$) can be considered to define a unique plane in 3D space. Let that plane be called P, and its equation in 3D can be given by:

$$P_1{}^*x+P_2{}^*y+P_3{}^*z+P_4=0,$$

where the coefficients $P_1$, $P_2$, $P_3$ and $P_4$ are known because the column coordinate p is known.

Let the line passing through pixel c and the camera center be called L. Note that the scene point S lies at the intersection of the line L and the plane P. Triangulation involves finding this intersection. The equation of the line L in 3D can be written as:

$$L(t)=(C_{Cam1},C_{Cam2},C_{Cam3})+t^*[(V_{c1},V_{c2},V_{c3})-(C_{Cam1},C_{Cam2},C_{Cam3})]$$

The line L is parameterized by a scalar parameter t. The goal is to find the value of t so that the resulting point on the line also lies on the plane P. The value of t is given as:

$$t=-\frac{P_1*C_{Cam1}+P_2*C_{Cam2}+P_3*C_{Cam3}+P_4}{P_1*(V_{c1}-C_{Cam1})+P_2*(V_{c2}-C_{Cam2})+P_3*(V_{c3}-C_{Cam3})}$$

Once t is computed, the 3D coordinates of the point S are given as:

$$S_x=C_{Cam1}+t^*(V_{c1}-C_{Cam1})$$

$$S_y=C_{Cam2}+t^*(V_{c2}-C_{Cam2})$$

$$S_z=C_{Cam3}+t^*(V_{c3}-C_{Cam3})$$

Finally, process 400 can end at 424.

It should be understood that at least some of the above described steps of process 400 of FIG. 4 can be executed or performed in any order or sequence not limited to the order and sequence shown and described in the figure. Also, some of the above steps of process 400 of FIG. 4 can be executed or performed substantially simultaneously where appropriate or in parallel to reduce latency and processing times.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for performing shape measurement, comprising:

a projector that:

(1) during a first time range, projects onto a scene a first plurality of illumination patterns, wherein each of the first plurality of illumination patterns has a given frequency and wherein the first plurality of illumination patterns has a mean frequency and a width of frequencies; and (2) during a second time range, projects a second plurality of illumination patterns, wherein each of the second plurality of illumination patterns has a given frequency, each of the second plurality of illumination patterns is projected onto the scene during a separate period of time, three different illumination patterns are projected with a first given frequency, and only one or two different illumination patterns are projected with a second given frequency, and wherein the second plurality of illumination patterns has the mean frequency and the width of frequencies;

a camera that:

(1) during the first time range, detects a first plurality of detected images of the scene, wherein each of the first plurality of detected images corresponds to one of the first plurality of illumination patterns; and (2) during the second time range, detects a second plurality of detected images of the scene; and a hardware processor that is configured to:

(1) during the first time range:

prior to the projector projecting onto the scene the first plurality of illumination patterns, select the mean frequency of the first plurality of illumination patterns and selects the width of frequencies of the first plurality of illumination patterns;

cause the projector to project the first plurality of illumination patterns;

cause the camera to detect the first plurality of detected images of the scene;

measure amplitudes of reflected light from the first plurality of illumination patterns detected in the first plurality of detected images;

determine a variation in the amplitudes of reflected light;

determine that the variation does not exceed a threshold; and select a set of frequencies of the second plurality of illumination patterns based on the mean frequency of the first plurality of illumination patterns and the width of frequencies of the first plurality of illumination patterns; and (2) during the second time range:
cause the projector to project the second plurality of illumination patterns;
cause the camera to detect the second plurality of detected images; and
measure a shape of an object in the scene based on the second plurality of detected images.

2. The system of claim 1, wherein the hardware processor is further configured to determine that the variation does not exceed the threshold based upon the variation corresponding to a small range of amplitudes.

3. The system of claim 2, wherein the small range of amplitudes are within 1% of each other.

4. The system of claim 2, wherein the small range of amplitudes are within 5% of each other.

5. The system of claim 2, wherein the small range of amplitudes are within 10% of each other.

6. The system of claim 1, wherein the hardware processor is further configured to perform phase unwrapping using the Gushov-Solodkin (G-S) algorithm.

7. The system of claim 1, wherein each of the given frequencies of the second plurality of illumination patterns is higher than 10 Hz.

8. The system of claim 1, wherein each of the given frequencies of the second plurality of illumination patterns is higher than 30 Hz.

9. A method for performing shape measurement, comprising:
(1) during a first time range:
selecting a mean frequency of a first plurality of illumination patterns and selecting a width of frequencies of the first plurality of illumination patterns, wherein each of the first plurality of illumination patterns has a given frequency;
causing a projector to project onto a scene the first plurality of illumination patterns;
causing a camera to detect a first plurality of detected images of the scene, wherein each of the first plurality of detected images corresponds to one of the first plurality of illumination patterns;
measuring amplitudes of reflected light from the first plurality of illumination patterns detected in the first plurality of detected images;
determining a variation in the amplitudes of reflected light;
determining that the variation does not exceed a threshold; and
selecting a set of frequencies of a second plurality of illumination patterns based on the mean frequency of the first plurality of illumination patterns and the width of frequencies of the first plurality of illumination patterns, wherein each of the second plurality of illumination patterns has a given frequency; and
(2) during a second time range:
causing the projector to project the second plurality of illumination patterns, wherein each of the second plurality of illumination patterns is projected onto the scene during a separate period of time, three different illumination patterns are projected with a first given frequency, and only one or two different illumination patterns are projected with a second given frequency;
causing the camera to detect a second plurality of detected images of the scene; and
measuring a shape of an object in the scene using the hardware processor based on the second plurality of detected images.

10. The method of claim 9, further comprising determining that the variation does not exceed the threshold based upon the variation corresponding to a small range of amplitudes.

11. The method of claim 10, wherein the small range of amplitudes are within 1% of each other.

12. The method of claim 10, wherein the small range of amplitudes are within 5% of each other.

13. The method of claim 10, wherein the small range of amplitudes are within 10% of each other.

14. The method of claim 9, further comprising performing phase unwrapping using the Gushov-Solodkin (G-S) algorithm.

15. The method of claim 9, wherein each of the given frequencies of the second plurality of illumination patterns is higher than 10 Hz.

16. The method of claim 9, wherein each of the given frequencies of the second plurality of illumination patterns is higher than 30 Hz.

17. A non-transitory computer-readable medium containing computer-executable instructions that, when executed by a processor, cause the processor to perform a method for performing shape measurement, the method comprising:
(1) during a first time range:
selecting a mean frequency of a first plurality of illumination patterns and selecting a width of frequencies of the first plurality of illumination patterns, wherein each of the first plurality of illumination patterns has a given frequency;
causing a projector to project onto a scene the first plurality of illumination patterns;
causing a camera to detect a first plurality of detected images of the scene, wherein each of the first plurality of detected images corresponds to one of the first plurality of illumination patterns;
measuring amplitudes of reflected light from the first plurality of illumination patterns detected in the first plurality of detected images;
determining a variation in the amplitudes of reflected light;
determining that the variation does not exceed a threshold; and
selecting a set of frequencies of a second plurality of illumination patterns based on the mean frequency of the first plurality of illumination patterns and the width of frequencies of the first plurality of illumination patterns, wherein each of the second plurality of illumination patterns has a given frequency; and
(2) during a second time range:
causing the projector to project the second plurality of illumination patterns, wherein each of the second plurality of illumination patterns is projected onto the scene during a separate period of time, three different illumination patterns are projected with a first given frequency, and only one or two different illumination patterns are projected with a second given frequency;
causing the camera to detect a second plurality of detected images of the scene; and
measuring a shape of an object in the scene based on the second plurality of detected images.

18. The non-transitory computer-readable medium of claim 17, wherein the method further comprises determining that the variation does not exceed the threshold based upon the variation corresponding to a small range of amplitudes.

19. The non-transitory computer-readable medium of claim 18, wherein the small range of amplitudes are within 1% of each other.

20. The non-transitory computer-readable medium of claim 18, wherein the small range of amplitudes are within 5% of each other.

21. The non-transitory computer-readable medium of claim 18, wherein the small range of amplitudes are within 10% of each other.

22. The non-transitory computer-readable medium of claim 17, wherein the method further comprises performing phase unwrapping using the Gushov-Solodkin (G-S) algorithm.

23. The non-transitory computer-readable medium of claim 17, wherein each of the given frequencies of the second plurality of illumination patterns is higher than 10 Hz.

24. The non-transitory computer-readable medium of claim 17, wherein each of the given frequencies of the second plurality of illumination patterns is higher than 30 Hz.

\* \* \* \* \*